(12) United States Patent
Kluckner et al.

(10) Patent No.: US 10,746,665 B2
(45) Date of Patent: Aug. 18, 2020

(54) METHODS AND APPARATUS FOR CLASSIFYING AN ARTIFACT IN A SPECIMEN

(71) Applicant: Siemens Healthcare Diagnostics Inc., Tarrytown, NY (US)

(72) Inventors: Stefan Kluckner, Berlin (DE); Yao-Jen Chang, Princeton, NJ (US); Terrence Chen, Princeton, NJ (US); Benjamin S. Pollack, Jersey City, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 149 days.

(21) Appl. No.: 16/072,386

(22) PCT Filed: Jan. 24, 2017

(86) PCT No.: PCT/US2017/014767
§ 371 (c)(1),
(2) Date: Jul. 24, 2018

(87) PCT Pub. No.: WO2017/132162
PCT Pub. Date: Aug. 3, 2017

(65) Prior Publication Data
US 2019/0033230 A1    Jan. 31, 2019

Related U.S. Application Data

(60) Provisional application No. 62/288,358, filed on Jan. 28, 2016.

(51) Int. Cl.
*G06K 9/00* (2006.01)
*G01N 21/90* (2006.01)
(Continued)

(52) U.S. Cl.
CPC ......... *G01N 21/90* (2013.01); *G01N 21/9027* (2013.01); *G01N 21/9036* (2013.01);
(Continued)

(58) Field of Classification Search
CPC combination set(s) only.
See application file for complete search history.

(56) References Cited

U.S. PATENT DOCUMENTS

| 5,764,792 | A | 6/1998 | Kennealy |
| 7,221,794 | B1 * | 5/2007 | Gloudemans, II .... G06T 15/205 |
| | | | 382/154 |

(Continued)

OTHER PUBLICATIONS

Extended EP Search Report dated Nov. 30, 2018 of corresponding European Application No. 17744774.5, 5 Pages.
(Continued)

*Primary Examiner* — Alex Kok S Liew

(57) ABSTRACT

A model-based method of inspecting a specimen for presence of one or more artifacts (e.g., a clot, bubble, and/or foam). The method includes capturing multiple images of the specimen at multiple different exposures and at multiple spectra having different nominal wavelengths, selection of optimally-exposed pixels from the captured images to generate optimally-exposed image data for each spectra, computing statistics of the optimally-exposed pixels to generate statistical data, identifying a serum or plasma portion of the specimen, and classifying, based on the statistical data, whether an artifact is present or absent within the serum or plasma portion. Testing apparatus and quality check modules adapted to carry out the method are described, as are other aspects.

20 Claims, 7 Drawing Sheets

(51) Int. Cl.
*G06T 7/00* (2017.01)
*G06T 7/143* (2017.01)
*G01N 35/00* (2006.01)
*G06T 7/77* (2017.01)
*G06T 7/174* (2017.01)
*G01N 21/88* (2006.01)
*G01N 35/10* (2006.01)

(52) U.S. Cl.
CPC ....... *G01N 35/00* (2013.01); *G01N 35/00732* (2013.01); *G06T 7/0012* (2013.01); *G06T 7/0014* (2013.01); *G06T 7/143* (2017.01); *G06T 7/174* (2017.01); *G06T 7/77* (2017.01); *G01N 2021/8861* (2013.01); *G01N 2021/8887* (2013.01); *G01N 2035/00801* (2013.01); *G01N 2035/1018* (2013.01); *G06T 2207/10056* (2013.01); *G06T 2207/10144* (2013.01); *G06T 2207/10152* (2013.01); *G06T 2207/20081* (2013.01); *G06T 2207/20221* (2013.01); *G06T 2207/30004* (2013.01); *G06T 2207/30024* (2013.01); *G06T 2207/30168* (2013.01)

(56) References Cited

U.S. PATENT DOCUMENTS

| | | |
|---|---|---|
| 2001/0004285 A1 | 6/2001 | Cadell |
| 2003/0231791 A1 | 12/2003 | Torre-Bueno et al. |
| 2004/0076319 A1* | 4/2004 | Fauver ............... G01N 15/1468 382/133 |
| 2005/0163354 A1* | 7/2005 | Ziegler ................. G01N 15/05 382/128 |
| 2007/0230795 A1* | 10/2007 | Abramoff ............ G06K 9/0061 382/190 |
| 2007/0289364 A1 | 12/2007 | Wiethoff et al. |
| 2008/0144898 A1 | 6/2008 | Hunt |
| 2008/0292169 A1* | 11/2008 | Wang ................... G06T 7/0012 382/131 |
| 2012/0140230 A1* | 6/2012 | Miller ................. G01N 15/042 356/441 |
| 2012/0169863 A1 | 7/2012 | Bachelet et al. |
| 2012/0224044 A1 | 9/2012 | Lett et al. |
| 2012/0263369 A1 | 10/2012 | Xie et al. |
| 2012/0316421 A1 | 12/2012 | Kumar et al. |
| 2015/0092200 A1 | 4/2015 | Zahniser et al. |

OTHER PUBLICATIONS

PCT International Search Report and Written Opinion dated Apr. 7, 2017 (10 Pages).

* cited by examiner

METHODS AND APPARATUS FOR CLASSIFYING AN ARTIFACT IN A SPECIMEN

FIELD

The present invention relates to methods and apparatus for testing of a biological specimen, and, more particularly to methods and apparatus for determining a presence of an artifact in the specimen.

BACKGROUND

Automated testing systems may conduct clinical chemistry or assays using one or more reagents to identify an analyte or other constituent in a biological specimen such as urine, blood serum, blood plasma, interstitial liquid, cerebrospinal liquids, and the like. For convenience and safety reasons, these specimens are almost universally contained in specimen containers (e.g., blood collection tubes). The assay or test reactions generate various changes that may be read and/or otherwise manipulated to determine a concentration of analyte or other constituent present in the specimen.

Improvements in automated testing technology have been accompanied by corresponding advances in pre-analytical sample preparation and handling operations such as sorting, batch preparation and loading, centrifugation of specimen to separate specimen constituents, cap removal to facilitate specimen access, and the like by automated pre-analytical specimen preparation systems, which may be part of a Laboratory Automation System (LAS). The LAS may automatically transport specimens contained in specimen containers to a number of pre-analytical specimen processing stations and analytical stations containing clinical chemistry analyzers and/or assay instruments.

LASs may handle a number of different specimens contained in bar code-labeled specimen containers at one time. The LAS may handle all different sizes and types of specimen containers, and they may also be intermingled. The bar code label may contain an accession number that may be correlated to demographic information that may be entered into a hospital's Laboratory Information System (LIS) along with test orders and other information. An operator may place the labeled specimen containers onto the LAS system, which may automatically transport the specimen containers for pre-analytical operations such as centrifugation, decapping, and aliquot preparation, and the like; all prior to the specimen actually being subjected to clinical analysis or assaying by one or more analyzers or instruments that may be part of the LAS. In some cases, multiple labels may be adhered to the specimen container obscuring views of the specimen.

For certain tests, a serum or plasma portion obtained from whole blood by fractionation (e.g., centrifugation) may be used. A gel separator may be added to the specimen container to aid in the separation of the settled blood portion from the serum or plasma portion in some cases. After fractionation and a subsequent de-capping process, the specimen container may be transported to an appropriate analyzer or instrument that may extract via aspiration, serum or plasma portion from the specimen container and combine the serum or plasma portion with one or more reagents in a reaction vessel (e.g., cuvette or other vessel). Analytical measurements may then be performed, often using a beam of interrogating radiation, for example, or by using photometric or fluorometric absorption readings, or the like. The measurements allow for the determination of end-point or rate values, from which a concentration of analyte or other constituent may be determined using well-known techniques.

Unfortunately, the presence of certain artifacts in the specimen, as a result of sample processing, may possibly adversely affect the accuracy of the test results of the analyte or constituent measurement obtained from the analyzer or instrument. For example, a clot in the specimen (e.g., a blood clot), which may be unrelated to the patient disease state, may cause a different interpretation of the disease condition of the patient. Further, aspiration of a clot may present other problems such as contamination or shut down time for cleaning. Presence of bubbles and/or foam may also cause a different interpretation of the disease condition of the patient.

In the prior art, the integrity of the serum or plasma portion of the specimen may be visually inspected by a skilled laboratory technician. This may involve a review of the color of the serum or plasma portion of the specimen and visual examination for clots, bubbles, and foam. A normal serum or plasma portion has a light yellow to light amber color, and may be free of clots, bubbles, and foam. However, visual inspection is very subjective, labor intensive, and fraught with the possibility of human error.

Because manual inspection includes the problems listed above, it is becoming increasingly important to evaluate the integrity of the specimen without the use of visual inspection by a laboratory technician, i.e., by using an automated pre-inspection method to the extent practical. The pre-inspection method is carried out prior to analysis at an analyzer or instrument. However, in some instances, bar code label(s) adhered directly to the specimen container may partially occlude the view of the specimen, so that there may not be clear opportunity to visually observe the serum or plasma portion of the specimen via normal automated processes.

In some systems, such as those described in US Pat. Pub. 2012/0140230 to Miller, describe rotating the specimen container to find a view window that is unobstructed by the label(s). However, such systems may be less prone to ease of automation.

Because of problems encountered when an artifact such as a clot, bubble, or foam is present within a specimen to be clinically analyzed, there is an unmet need for a method and apparatus adapted to readily and automatically determine a presence of such artifacts. The method and apparatus should not appreciably adversely affect the speed at which analytical or assaying test results are obtained. Furthermore, the method and apparatus should be able to be used even on labeled specimen containers, where one or more labels occlude some portion of the specimen.

SUMMARY

According to a first aspect, a method of determining a presence of an artifact in a specimen contained within a specimen container provided. The method includes providing a specimen that is separated and contained in a specimen container, capturing images of the specimen at multiple different exposures and at multiple different wavelengths, selecting optimally-exposed pixels from the captured images at the different exposures at each wavelength to generate optimally-exposed image data for each wavelength, computing statistics on the optimally-exposed pixels at the different wavelengths to generate statistical data, identifying a serum or plasma portion of the specimen based on the statistical data, and classifying, based on the statistical data, whether an artifact is: present within one or more regions of the serum or plasma portion, or absent within the serum or plasma portion.

According to another aspect, a quality check module adapted to determine presence of an artifact in a specimen contained within a specimen container is provided. The quality check module includes a plurality of cameras arranged around the specimen container and configured to capture multiple images of the specimen container from multiple viewpoints, each adapted to generate a plurality of images taken at multiple different exposure times and at multiple different wavelengths, a computer coupled to the plurality of cameras and adapted to process image data from the images, the computer configured and capable of being operated to: select optimally-exposed pixels from the images at the different exposure times to generate optimally-exposed image data for each wavelength, compute statistics of the optimally-exposed pixels at each of the wavelengths to generate statistical data, identify a serum or plasma portion of the specimen, and classify, based on the statistical data, whether an artifact is: present within one or more regions of the serum or plasma portion, or absent within the serum or plasma portion.

In another aspect, a testing apparatus adapted to determine a presence of an artifact in a specimen contained within a specimen container is provided. The testing apparatus includes a track, a carrier on the track that is configured to contain the specimen container, a plurality of cameras arranged around the track and configured to capture multiple images of the specimen container from multiple viewpoints, each camera is configured to generate a plurality of images at multiple different exposures and multiple different wavelengths, and a computer coupled to the cameras and configured to process image data from the multiple images, the computer configured and capable of being operated to: select optimally-exposed pixels from the multiple images at the different exposures to generate optimally-exposed image data for each wavelength, compute statistics on the optimally-exposed pixels at the different wavelengths to generate statistical data, identify a serum or plasma portion of the specimen, and classify, based on the statistical data, whether an artifact is: present within one or more regions of the serum or plasma portion, or absent within the serum or plasma portion.

Still other aspects, features, and advantages of the present invention may be readily apparent from the following description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the appended claims.

BRIEF DESCRIPTION OF THE DRAWINGS

The drawings, described below, are for illustrative purposes only and are not necessarily drawn to scale. The drawings are not intended to limit the scope of the invention in any way. Like numerals are used throughout the drawings to denote like elements.

DESCRIPTION

Figure 1:
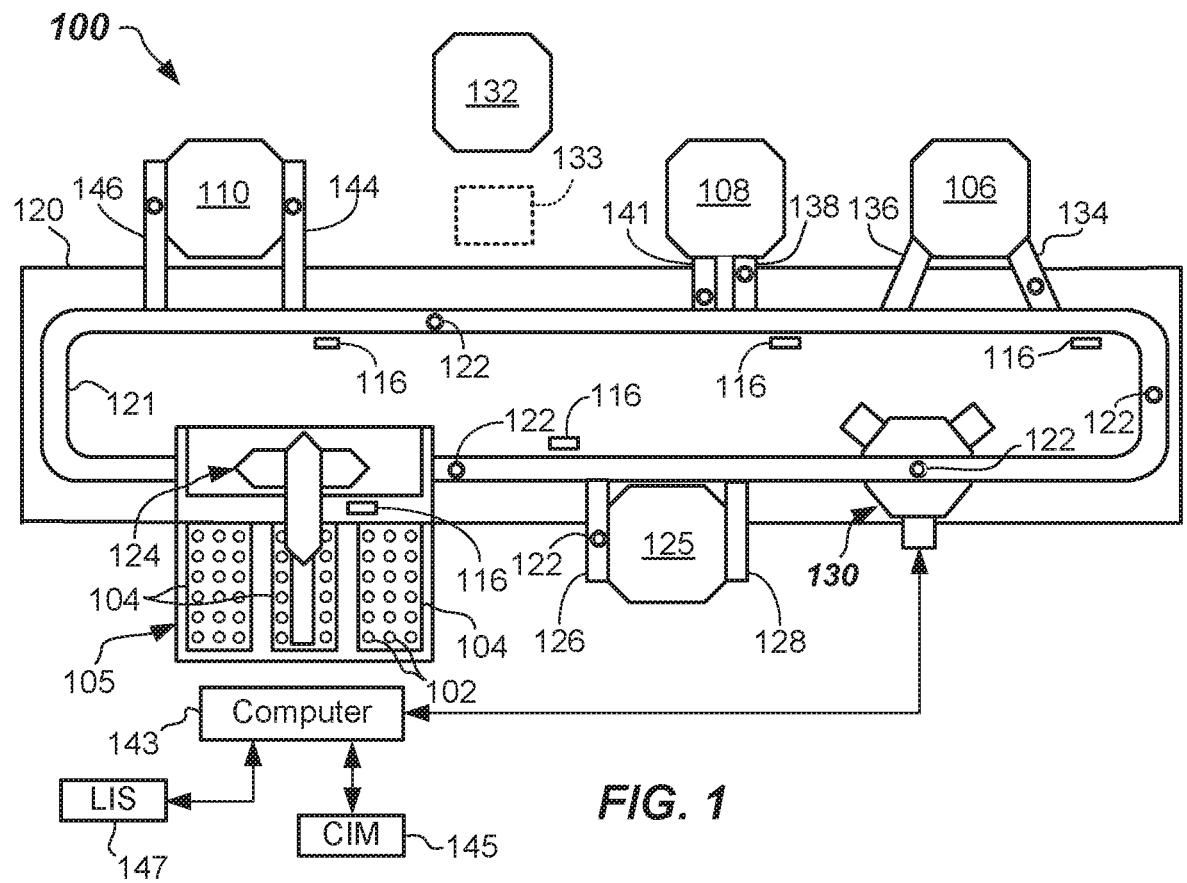
FIG. 1 illustrates a top view of a specimen testing apparatus including one or more quality check modules and one or more analyzers (clinical chemistry or assay instruments) according to one or more embodiments.

In a first broad aspect, embodiments of the present invention provide imaging methods and apparatus for determining if one or more artifact is present in a serum or plasma portion of a specimen or whether the serum or portion is "normal," i.e., does not contain an artifact. "Artifact," as used herein, shall mean a clot, bubble, or foam in the serum or plasma portion of the specimen. A "clot" as used herein is defined as a coagulated mass present in the serum or plasma portion that is produced by clotting of whole blood. "Bubble" as used herein means an isolated substantially spherical pocket of gas in the serum or plasma portion that is not foam. Bubbles may have diameter between about 0.2 mm and about 1.0 mm, for example. "Foam" as used herein means a collection or grouping of small substantially spherical pockets of gas, grouped together in close proximity to one another at a top of the serum or plasma portion. Individual ones of the spherical pockets of gas for foam may have a diameter of between about 0.1 mm to about 0.5 mm, for example. The presence of one or more artifacts in the serum or portion may affect the interpretation of results of other pre-analytical testing, such as testing for an interferent such as hemolysis (H), icterus (I), and/or Lipemia (L), but also of the subsequent analytical testing. Presence of a clot may cause clogging of the pipette used for later aspiration of the serum or plasma portion, thereby possibly causing disruption of the testing process.

The specimen, as described herein, may be collected in a specimen container, such as a blood collection tube and includes a settled blood portion and a serum and plasma portion after fractionation (e.g., separation by centrifugation). The settled blood portion is made up blood cells such as white blood cells (leukocytes), red blood cells (erythrocytes), and platelets (thrombocytes), which are aggregated and separated from the serum or plasma portion, usually through undergoing centrifugation. The settled blood portion is generally found at a bottom part of the specimen container. The serum or plasma portion is the liquid component of blood, which is not part of the settled blood portion. It is generally found above the settled blood portion. Plasma and serum differ in the content of coagulating components, primarily fibrinogen. Plasma is the un-clotted liquid, whereas serum refers to blood plasma, which has been allowed to clot, either under the influence of a clotting agent such as endogenous enzymes or exogenous components. The serum or plasma portion will be made of serum or plasma depending upon whether exposed to a clotting agent. In some specimen containers, a small gel separator may be used, which generally positions itself between the settled blood portion and the serum or plasma portion during centrifugation. It serves as a separation barrier between the two portions.

In accordance with one or more embodiments, the method may be carried out as a pre-analytical testing method, i.e., as screening before carrying out analysis on a clinical analyzer or assaying instrument. In one or more embodiments, the method may be carried out prior to, or simultaneous with, the specimen being characterized for the presence of an interferent (e.g., Hemolysis, Icterus, or Lipemia (HIL)). In particular, one or more embodiments of the present invention provides a specimen for further pre-analytical testing or analytical testing after being pre-inspected for a presence of one or more artifacts at a quality check module.

In one or more embodiments, the method uses high dynamic range (HDR) image processing of the serum or plasma portion of the specimen to aid in determining the presence of an artifact. Of course, in some embodiments, the identification of the location of various physical boundaries of the serum or plasma portion, and/or other components may also take place using HDR.

If the method determines that no artifacts exist, the serum or plasma portion may be tested for the presence of an interferent, such as hemolysis, icterus, and/or lipemia (hereinafter "HIL"). If the serum or plasma portion is indeed found to contain an artifact, the specimen may be subjected to further processing in some embodiments. For example, an identified clot, bubble, or foam may be taken to an auxiliary station for manual removal of the clot, bubble, or foam by an operator. After such remediation, the specimen may be allowed to continue on, and undergo further pre-screening, such as interferent analysis (HIL analysis), or be sent on for routine analysis by one or more analyzers and/or assaying instruments.

In some embodiments, a quality check module that is configured to carry out the artifact detection method is provided. The quality check module may be provided in an area where a robotic or transport mechanism may transport specimens contained in specimen containers to the quality check module. In some embodiments, the quality check module may be provided on a conveyor track, where the conveyor tract carries the specimens to remote locations for analysis (e.g., analytical testing or assaying) on an analyzer and/or instrument. In a specific embodiment, the quality check module may be provided on the track so that the specimen may be tested for the presence of an artifact while resident on the track.

In one or more embodiments, the processed HDR data may be used for both artifact detection and HIL detection. In this case, the pixels that are found to contain artifacts may simply be ignored in carrying out the subsequent determination of HIL based upon the data, as the artifact location(s) and extent is known. Should the specimen be found to contain an artifact or one or more of HIL, the specimen may be taken off line to perform a remediation for rectifying the artifact, the one or more of HIL, or for a discard and redraw.

All the captured images used by the methods herein are pixelated images containing a plurality of pixels. Pixel as used herein means single pixels or a grouping of pixels, such as a super pixel. A super pixel having a size of 11 individual pixels by 11 individual pixels was found to work well. Other sizes of super pixels may be used.

In another aspect of one or more embodiments of the invention, the data obtained from the artifact analysis can be used to determine the volume of the serum or plasma portion, and also possibly a volume of the settled blood portion. The data may also be used to determine the true liquid-air interface (LA), even when foam is present, interfaces between serum or plasma portions and settled blood portion (SB), and interfaces between serum or plasma portions and gel separator (SG), or interfaces between settled blood portion and gel separator (BG) when a gel separator is present.

The artifact detection method including HDR processing may include capturing multiple images at the quality check module at multiple exposure times, at multiple wavelengths, and from multiple viewpoints. In one or more embodiments, multiple images are captured at the quality check module at multiple exposure times and multiple wavelengths by cameras from multiple viewpoints. "Camera" as used herein means any device capable of capturing an image (e.g., digital image) for analysis.

The images captured by the multiple cameras are then processed by a computer to determine segmentation of the specimen. During the segmentation process, for each pixel for each of the images, pixels exhibiting optimal image intensity may be selected and combined to generate consolidated color image data sets. The result is a plurality of consolidated color image data sets (e.g., red (R), green (G), blue (B)) where all of the pixels are optimally exposed (e.g., one image data set per wavelength spectra (e.g., RGB). The data from the consolidated color data sets may be subject to statistical analysis to determine statistical data on each pixel (e.g., mean, standard deviation, and covariance) thereof. "Covariance" is a measure of how much two or more of the color pixels change together. This statistical data, in the form of one or more data matrices, can then be operated on by a multi-class classifier. From this, the segmentation of the various areas of the specimen and specimen container specimen may be determined. In particular, the liquid area comprising the serum or plasma portion of the specimen may be identified. The multi-class classifier may be a support vector machine (SVM) or a random decision tree that has been trained from multiple training sets.

Once the liquid region (i.e., the serum or plasma portion) is determined based upon the segmentation process, one or more artifact classifier models may be used to determine if there is an artifact present in the liquid region. The one or more artifact classifier models may be pre-trained binary models that classify each pixel as being clot or not a clot, as being a bubble or not a bubble, or as being foam or not foam, respectively. The artifact classifier models may also each be a support vector machine (SVM) or a random decision tree, and may be appropriately trained with hundreds of samples to be able to recognize each artifact.

Subsequent to the classification of each pixel in the serum or plasma portion as either normal or containing an artifact, the pixels may then be classified as being normal (N), or as containing an interferent, such as hemolysis (H), icterus (I), or lipemia (L), using another model (e.g., an interferent classifier model) in some embodiments. Based upon the pixel classification results, an interferent type for the serum or plasma portion, as a whole, may be determined. An interferent level for the determined interferent type may also be provided.

Further details of inventive artifact detection methods, quality check modules, and specimen testing systems including a quality check module will be further described with reference to FIGS. 1-8 herein.

FIG. 1 shows a specimen testing system 100 capable of and operable to automatically process multiple ones of the specimen containers 102 that may be contained in one or more racks 104 provided at a loading area 105 prior to analysis by one or more analyzers (e.g., first, second, and third analyzer 106, 108, 110, respectively, arranged about the specimen testing system 100). It should be apparent that more or less numbers of analyzers can be used. The analyzers may be one or more clinical chemistry analyzers and/or one or more assaying instruments, or the like, or combinations thereof. The specimen containers 102 may be any generally clear or transparent container, such as blood collection tubes—see FIG. 2).

Figure 2:
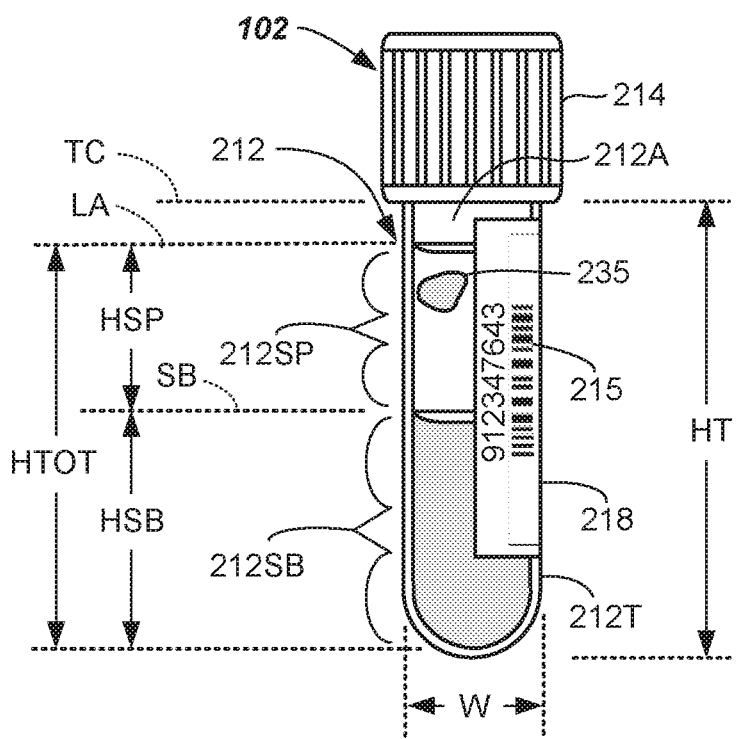
FIG. 2 illustrates a side view of a labeled specimen container including a separated specimen containing a clot artifact, which may be determined using an artifact detection method according to one or more embodiments.

Typically, specimens 212 (FIG. 2) to be automatically processed may be provided to the specimen testing system 100 in the specimen containers 102, which may be capped with a cap 214 (FIG. 2—otherwise referred to as a stopper). The caps 214 may have different shapes or colors (e.g., red, royal blue, light blue, green, grey, tan, yellow, or other colors). The colors provide useful information about the testing to be performed, in some instances. Each of the specimen containers 102 may include a transparent or translucent body that may be provided with identification information 215. Identification information 215 may include a bar code, an alphabetic, numeric, or alphanumeric indicia, or combination thereof that may be machine readable at various locations about the specimen testing system 100. The identification information 215 may indicate a patient's identification or may be correlated to tests ordered on the specimen 212, or other information, for example. Such identification information 215 may be generally provided on a label 218 adhered to, or otherwise provided on the side of, the specimen container 102. The label 218 generally does not extend all the way around the specimen container 102, or all along a length of the specimen container 102. Accordingly, although the label 218 may occlude some portion of the specimen 212, some portion of the specimen 212 may still be viewable. In some embodiments multiple slightly overlapping labels 218 may be present. In some embodiments, the racks 104 may have additional identification information thereon that may be used for tracking. The identification information 215 on the specimen container 102 may be interfaced with the LIS 147 to access test orders, results, and other information.

After fractionation, the specimen 212 may include a serum or plasma portion 212SP, a settled blood portion 212SB contained within the tube 212T. Air 212A may be provided above the serum and plasma portion 212SP and the line or demarcation between air 212A and the serum or plasma portion 212SP is defined herein as the liquid-air interface (LA). The line of demarcation between the serum or plasma portion 212SP and the settled blood portion 212SB is defined herein as the serum-blood interface (SB). The interface between the air 212A and the cap 214 is referred to herein as the tube-cap interface (TC). The height of the tube (HT) is defined as the height from the physical bottom of the tube 212T to the bottom of the cap 214. The height of the serum or plasma portion 212SP is (HSP) is defined as the height from the top of the settled blood portion 212SB to the top of the serum or plasma portion 212SP, i.e., from SB to LA. The height of the settled blood portion 212SB is (HSB) and is defined as the height from the bottom of the settled blood portion 212SB to the top of the settled blood portion 212SB. In embodiment where a gel separator 413 is used, such as FIG. 4, an interface (SG) between the serum or plasma portion 212SP and the gel separator 413 is present. Likewise, an interface (BG) between the settled blood portion 212SB and the gel separator 413 is present. HTOT is HSB plus HSP. W is the width of the tube 212T.

In more detail, specimen testing system 100 may include a base 120 (e.g., a frame or other structure) upon which a track 121 may be mounted or supported. Track 121 may be a railed track (e.g., monorail track or a multiple rail track), a collection of conveyor belts, chains, platforms, or other suitable conveyance mechanisms. Track 121 may have a circular or serpentine shape and may be a closed track in some embodiments. Track 121 may transport individual ones of the specimen containers 102 that may be carried on the track 121 in carriers 122, or multiple ones in some embodiments.

In one or more embodiments, carriers 122 may be pucks that are configured to carry a single specimen container 102. In some embodiments, the carrier 122 including an onboard drive motor, such as a linear motor, that is configured to move the specimen container 102 about the track 121 while stopping and starting as programmed. Carriers 122 may each include a holder adapted to hold and secure the specimen container 102 in a defined upright position. Holder may include three or more thin beams.

In some embodiment, carriers 122 may leave from the loading area 105 having one or more racks 104 thereat. Loading area 105 may serve a dual function of also allowing offloading of the specimen containers 102 from the carriers 122 after processing. A robot 124 may be provided at the loading area 105 and may be configured to grasp the specimen containers 102 from the one or more racks 104 and move and load the specimen containers 102 onto the carriers 122, such as on an input lane of the track 121. Input lane may be part of the main portion of the track 121 or an offshoot therefrom. Robot 124 may also be configured to remove specimen containers 102 from the carriers 122 upon completion of testing. The a robot 124 may include one or more (e.g., least two) robot arms or components capable of X and Z, Y and Z, X, Y, and Z, or r and theta motion, wherein the robot 124 may be equipped with robotic clamping fingers adapted to pick up and place the specimen containers 102. However, any suitable type of robot 124 may be used.

Upon being loaded onto track 121 by robot 124, the specimen containers 102 carried by carriers 122 may progress to a centrifuge 125 (e.g., an automated centrifuge configured to carry out fractionation of the specimen 212)

and may be diverted to the centrifuge 125 by inflow lane 126. After being centrifuged, the specimen containers 102 may exit on outflow lane 128 and continue on the track 121. In some embodiment, the carriers 122 may move to a quality check module 130 to be further described herein with reference to FIGS. 5A and 5B. Optionally, the centrifugation may occur previously and the specimens 212 contained in specimen containers 102 may be loaded directly into a quality check module 130 that is located at the loading area 105, such as part of the input lane.

The quality check module 130 is configured and adapted to automatically determine a presence of one or more artifacts contained in a specimen 212 to be processed by the specimen testing system 100. If found to contain no artifact(s), the specimens 212 may continue on the track 121 and then may be analyzed in the one or more analyzers (e.g., first, second and third analyzers 106, 108, and/or 110) before returning each specimen container 102 to the loading area 105 for offloading. In some embodiments, the specimen 212 may additionally be tested for the presence of HIL at the quality check module 130. Other characterizations may be carried out by the quality check module 130.

In some embodiments, quantification of the specimen 212 may take place at the quality check module 130 (i.e., determination of HSB, HSP, HTOT, and determination of location of SB, LA, SG, and/or BG). In some embodiments, quantification of the physical attributes of the specimen container 102 may take place at the quality check module 130 (i.e., determining HT, cap color, cap type, TC, tube type, and/or W). As will be apparent, the holder may also be identified, but may be ignored when later processing the images.

Additionally, a remote station 132 may be serviced by the automated specimen testing system 100 even though the remote station 132 is not directly linked to the track 121 of the specimen testing system 100. For instance, an independent robot 133 (shown dotted) may carry specimen containers 102 to the remote station 132 and return them after testing/processing. Optionally, the specimen containers 102 may be manually removed and returned. Remote station 132 may be used to test for certain constituents, such as a hemolysis level, or may be used for further processing, such as to lower a lipemia level through additional processing, or remove an artifact found in the specimen 212, such as a clot, bubble or foam, for example. Other testing or processing may be accomplished on remote station 132.

The specimen testing system 100 may include a number of sensors 116 at one or more locations around the track 121. Sensors 116 may be used to detect a location of specimen containers 102 along the track 121 by means of reading the identification information 215 (FIG. 2) placed on the specimen container 102, or like information (not shown) that is provided on each carrier 122, such as a barcode. Other means for tracking the location of the carriers 122 may be used, such as proximity sensors. All of the sensors 116 interface with the computer 143 so that the location of each specimen container 102 is known at all times. Computer 143 may interface and communicate with LIS 147 in a known manner.

Centrifuge 125 and each of the analyzers 106, 108, 110 may be generally equipped with robotic mechanisms and/or inflow lanes (e.g., inflow lanes 126, 134, 138, 144) configured to remove carriers 122 from the track 121, and robotic mechanisms and/or outflow lanes (e.g., outflow lanes 128, 136, 141 and 146) configured to reenter carriers 122 to the track 121.

Specimen testing system 100 may be controlled by the computer 143, which may be a microprocessor-based central processing unit CPU, having a suitable memory and suitable conditioning electronics and drivers for operating the various system components. Computer 143 may be housed as part of, or separate from, the base 120 of the specimen testing system 100. The computer 143 may operate to control movement of the carriers 122 to and from the loading area 105, motion about the track 121, motion to and from the centrifuge 125, operation of the centrifuge 125, motion to and from the quality check module 130 as well as operation of the quality check module 130, and motion to and from each analyzer 106, 108, 110, and in some cases, possibly operation of each analyzer 106, 108, 110 carrying out the various types of testing (e.g., assay or clinical chemistry).

For all but the quality check module 130, the computer 143 may control the specimen testing system 100 according to software, firmware, and/or hardware commands or circuits such as those used on the Dimension® clinical chemistry analyzer sold by Siemens Healthcare Diagnostics Inc. of Tarrytown, N.Y., and such control is typical to those skilled in the art of computer-based electromechanical control programming and will not be further described herein. However, other suitable systems for controlling the specimen testing system 100 may be used. The control of the quality check module 130 may also be provided by the computer 143, but according to an inventive model-based method, as will be described in detail herein.

Embodiments of the present invention may be implemented using a computer interface module (CIM) 145 that allows for a user to easily and quickly access a variety of control and status display screens. These control and status screens may describe some or all aspects of a plurality of interrelated automated devices used for preparation and analysis of specimens 212. The CIM 145 may employed to provide information about the operational status of a plurality of interrelated automated devices as well as information describing the location of any specimen 212 as well as a status of tests to be performed on, or being performed on, the specimen 212. The CIM 145 may be adapted to facilitate interactions between an operator and the specimen testing system 100. The CIM 145 may include a display screen adapted to display a menu including icons, scroll bars, boxes, and buttons through which the operator may interface with the specimen testing system 100. The menu may comprise a number of function buttons programmed to display functional aspects of the specimen testing system 100.

Figure 3:
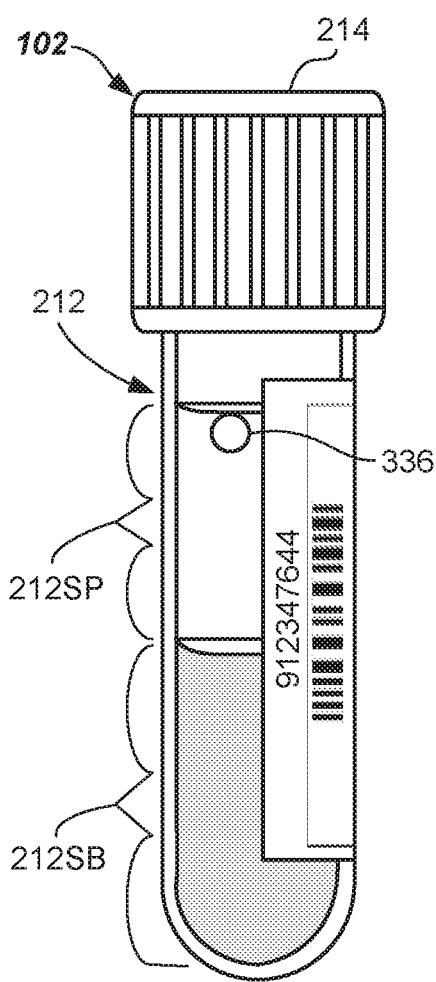
FIG. 3 illustrates a side view of a labeled specimen container including a separated specimen containing a bubble artifact, which may be determined using an artifact detection method according to one or more embodiments.
Figure 4:
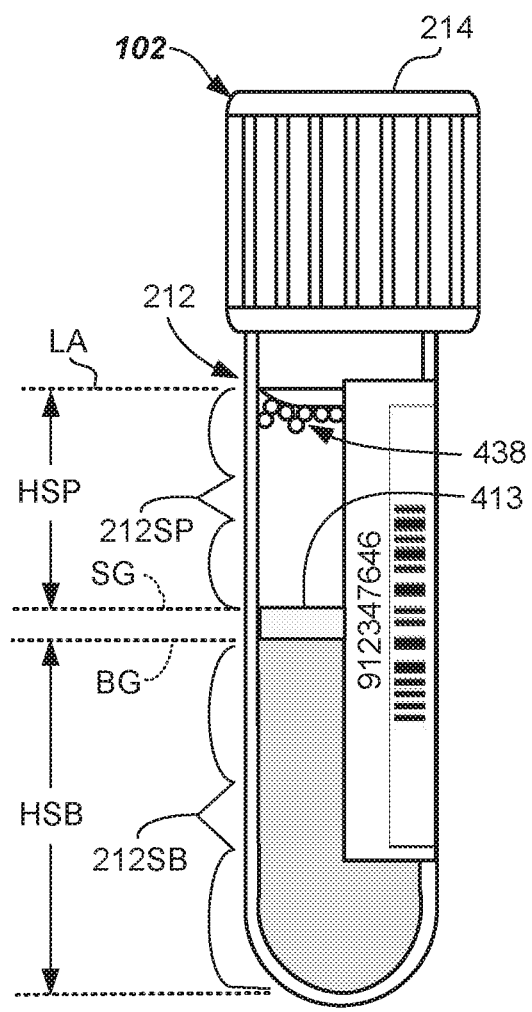
FIG. 4 illustrates a side view of a labeled specimen container including a separated specimen containing a foam artifact, which may be determined using an artifact detection method according to one or more embodiments.

In FIGS. 2, 3, and 4, specimen containers 102 including various artifacts are shown. The artifacts are selected from a group including a clot, a bubble, or foam. FIG. 2 illustrates an artifact that is a clot 235, which is a thick, viscous, or coagulated mass or lump, as of blood that is not settled blood portion 212SB. The clot 235 may be free-floating within the serum or plasma portion 212SP. Pre-screening the specimen containers 102 for the presence of an artifact that is a clot 235 ensures that the specimen 212 can be stopped from progressing on to the one or more analyzers 106, 108, and/or 110. In this way, clogging of a pipette of an analyzer or otherwise inaccurate test results may be avoided. If the method determines that a clot artifact exists, then the specimen container 102 may be taken offline, such as to the remote station 132 for remedial action (e.g., clot removal) or to possibly have the specimen 212 redrawn.

FIG. 3 illustrates a specimen 212 within the specimen container 102 wherein the artifact is one or more bubbles 336, which are substantially circular pockets of gas contained in the serum or plasma portion 212SP. The bubbles 336 may be adhered to the walls of the specimen container 102 or arranged at a top surface of the serum or plasma portion 212SP, for example. Pre-screening the specimen 212 in the specimen container 102 for the presence of one or more bubbles 336 ensures that the specimen 212 can be stopped from progressing on to the one or more analyzers 106, 108, and/or 110, if so desired. In this way, possibly inaccurate results may be avoided by avoiding the possibility of aspirating a bubble 336, i.e., air into a pipette used on the analyzers 106, 108, 110. If the artifact determining method characterizes that one or more bubble artifacts indeed exists, then the specimen container 102 may be taken offline, such as to remote station 132 for remedial action (e.g., bubble removal).

FIG. 4 illustrates a specimen 212 within the specimen container 102 wherein the artifact is foam 438, which is a collection or grouping of substantially circular pockets of gas contained in the serum or plasma portion 212SP located along the top surface of the serum or plasma portion 212SP, for example. Pre-screening the specimen containers 102 for the presence of foam 438 ensures that the specimen 212 can be stopped from progressing to the one or more analyzers 106, 108, and/or 110, if so desired. In this way, possibly inaccurate results may be avoided by avoiding or minimizing the possibility of aspirating the foam 438. If the artifact determination method determines that a foam artifact exists, then the specimen container 102 may be taken offline, such as to remote station 132 for remedial action (e.g., removal of foam 438). Optionally, the specimen 212 may be allowed to progress to the analyzer 106, 108, 110 for analysis because now the true location of the top of the serum or plasma portion 212SP at the LA interface is known, so that the pipette can be moved sufficiently far below the foam 438 during aspiration of the serum or plasma portion 212SP so that the propensity of aspirating foam 438 is substantially minimized.

In one or more embodiments, if an artifact is noted by the artifact detection method, the method may also determine the extent and location(s) of the artifact so that those pixels containing any artifact in the images may be ignored for other pre-screening (e.g., pre-screening for HIL or specimen quantification).

Figure 5A:
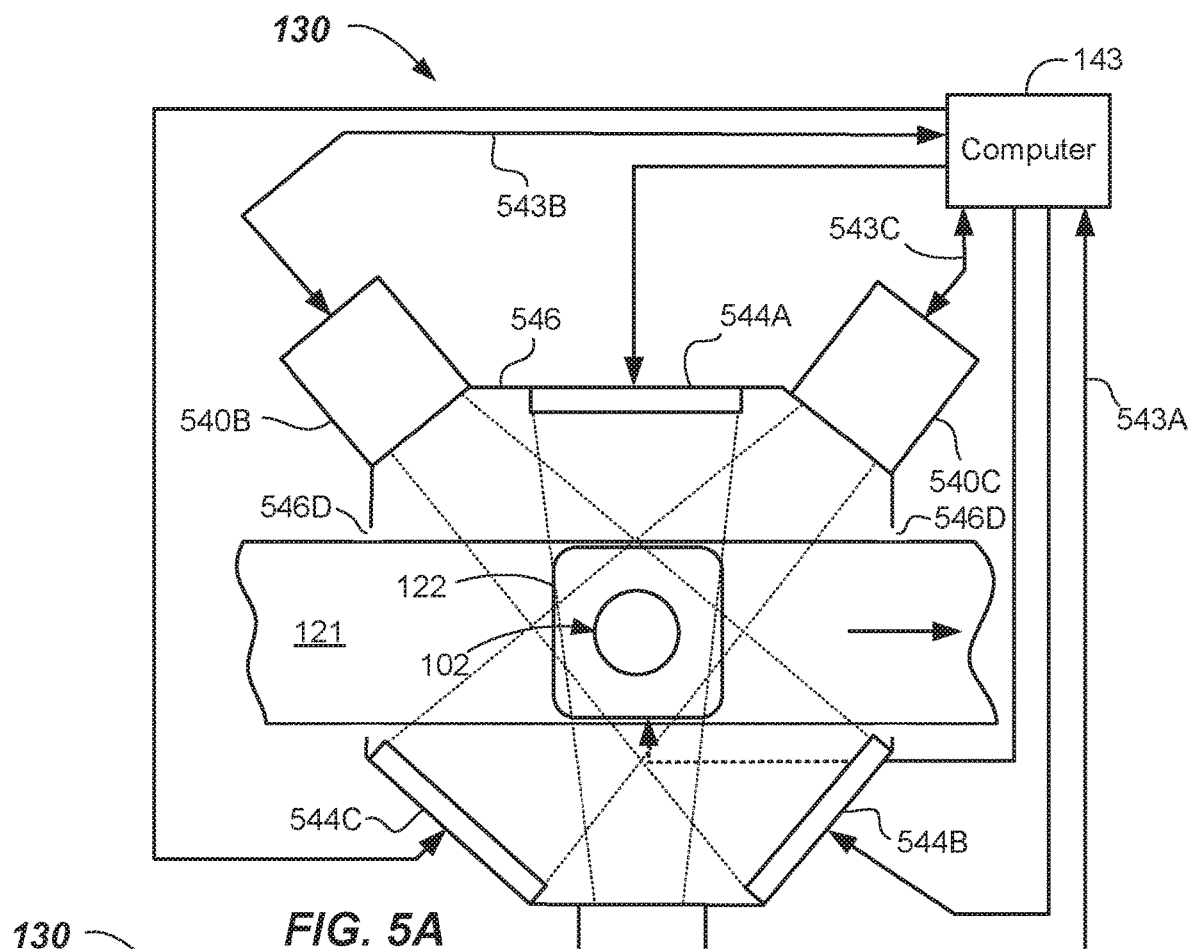
FIG. 5A illustrates a schematic top view of a quality check module (with top housing portion removed to aid illustration) configured to capture and analyze multiple images for a presence of an artifact (e.g., clot, bubble, and/or foam) according to one or more embodiments.
Figure 5B:
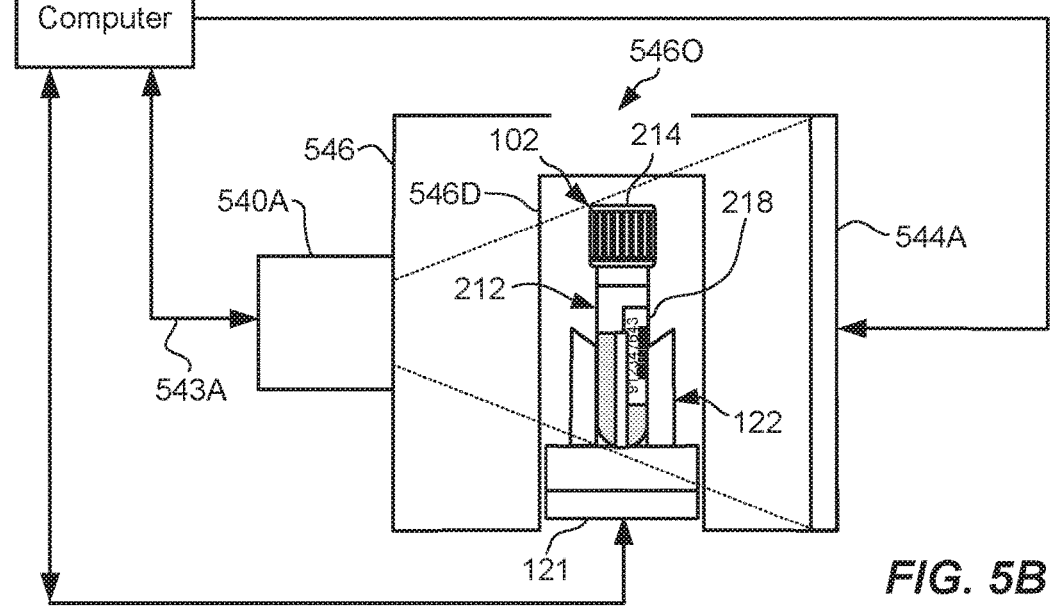
FIG. 5B illustrates a schematic side view (with side housing portion removed to aid illustration) of the quality check module of FIG. 5A according to one or more embodiments.

With reference to FIGS. 5A-5B, a first embodiment of a quality check module 130 is shown and described. Quality check module 130 may be configured and adapted to automatically determine a presence of one or more artifacts (e.g., clot 235, bubble 336, and/or foam 438) in a specimen 212 (e.g., in a serum or plasma portion 212SP thereof). The method may be used in some testing apparatus to identify only one artifact (e.g., a clot 235, a bubble 336, or foam 438). However, in other embodiments, the method may be used to seamlessly identify all three artifacts. The presence of the one or more artifacts may be detected by the quality check module 130 prior to being automatically processed by one or more of the analyzers 106, 108, 110. In this manner, if the specimen 212 includes an artifact, additional processing, discarding, or a specimen 212 redraw may take place, and without wasting valuable analyzer resources or possibly having the presence of an artifact affect the veracity of the test results.

In addition to the artifact detection method, other detection methods may take place on the specimen 212 contained in the specimen container 102 at the quality check module 130. For example, a detection method may be used to quantify the specimen container 102 at the quality check module 130. For example, the quality check module 130 may be used to quantify the specimen 212, i.e., determine certain physical dimensional characteristics of the specimen 212 (e.g., a physical location of LA, SB, SG, and/or BG, and/or determination of HSP, HSB, and/or HTOT, and/or a volume of the serum or plasma portion (VSP) and/or a volume of the settled blood portion (VSB)).

Furthermore, the quality check module 130 may be used to quantify the specimen container 102, i.e., quantify certain physical dimensional characteristics of the specimen container 102, such as the location of TC, HT, and/or W of the specimen container 102, or a color of and/or type of the cap 214. The quality check module 130 may be used to quantify the holder such that the holder may be ignored when later processing the images.

Again referring to FIGS. 1, 5A and 5B, the quality check module 130 may include multiple cameras (e.g., two or more, three or more, four or more). Cameras may be conventional digital cameras (e.g., color or monochrome cameras), charged coupled devices (CCD), an array of photodetectors, one or more CMOS sensors, a spectrophotometer, or the like. For example, three cameras 540A, 540B, 540C are illustrated in FIG. 5A and may be configured to capture images from three different viewpoints. Other numbers of cameras may be used. Each camera 540A, 540B, 540C may be a device capable of capturing a digital image (i.e., a pixelated image). The image resolution of each image may be about 0.5 by 3 megapixels, for example. Other pixel densities may be used. Each camera 540A, 540B, 540C may be configured and operable to capture lateral images of at least a segment or lateral portion of the specimen container 102, and at least a portion of the specimen 212, and possibly capture a part of the label 218 and cap 214. Eventually, from the multiple images, a composite image of the specimen 212 in the specimen container 102 can be developed. In some embodiments, the final composite image may be a 3D image.

In the embodiment shown, the plurality of cameras 540A, 540B, and 540C may be arranged around the specimen 212 and configured to capture images from multiple viewpoints. The viewpoints may be spaced at approximately equally intervals from one another. As depicted, the intervals may be about 120 degrees from one another, when three cameras 540A, 540B, 540C are used. In the embodiment shown, the cameras 540A, 540B, 540C may be arranged around the sides of the track 121. Other arrangements of the plurality of cameras 540A, 540B, and 540C may be used. In this way, the images of the specimen 212 in the specimen container 102 may be taken while the specimen container 102 is residing and held in the carrier 122 on the track 121.

In one or more embodiments, the carrier 122 may be stopped at the pre-determined location in the quality check module 130, such as at a point where normal vectors from each of the focal points of the cameras 540A, 540B, and 540C intersect. In some embodiments, a gate may be provided to stop the carrier 122, so that good quality images may be captured. In other embodiments, the carrier 122 may include a linear motor configured to start and stop the carrier 122 at desired locations, such as at the quality check module 130.

The cameras 540A, 540B, 540C may be provided in close proximity to and trained or focused to capture an image window, i.e., an area including an expected location of the surface of the specimen container 102, wherein the specimen container 102 may be approximately located in a center of the image window. As configured, the cameras 540A, 540B, 540C can capture images that include portions of the serum or plasma portion 212SP, portions of the settled blood portion 212SB, and some or all of the cap 214. Within the images captured, one or more reference datum may be present. The reference datum may aid in further quantification of the specimen 212 and/or specimen container 102. Reference datum may be TC or a bottom-most surface of the specimen container 102, or both. Optionally, the specimen containers 102 themselves may include a mark or other locating indicia thereon.

In operation, each captured image may be triggered and captured responsive to a triggering signal. The triggering signal may be generated by the computer 143 and provided in communication lines 543A, 543B, 543C coupled to the computer 143. Each of the captured images may be processed according to one or more embodiments of the method provided herein. In particular, HDR may be used to capture and process the multiple images.

In more detail, multiple images are captured of the specimen 212 at multiple different exposure times, and at one or more different wavelengths. For example, each camera 540A, 540B, 540C may take about 4-8 images at different exposure times and at one or more wavelengths.

The multiple wavelength images may be accomplished by different methods. In one embodiment, the multiple images may be captured by illuminating using different colored light sources 544A-544C. The light sources 544A-544C may backlight the specimen container 102 (as shown in FIGS. 5A-5B) and may be embodied as light panels, for example. Light panels may include arrays of different lights having different spectra with different nominal wavelengths or otherwise include means for pumping different colored lights therein. Light diffusers may be used in conjunction with the light sources 544A-544C in some embodiments. In this embodiment, the cameras 540A-540C may be digital monochrome cameras. The light sources 544A-544C may capture images illuminated by various spectra having different nominal wavelengths that have relatively narrow bandwidth of about +/−35 nm. The light sources may have emission peaks at approximately 634 nm (red), 537 nm (green), and 455 nm (blue), respectively. However, other wavelengths may be used and more or less than three light sources may be used. Multispectral, multi-exposure time images may then be captured by each of the cameras 540A-540C from the different viewpoints. Each of the spectrally illuminated images (represented by a nominal wavelength with some narrow band) is captured at various exposure times (e.g., 4-8 exposures or more). For the artifact detection method, transmittance images may be computed, wherein each transmittance image (R,G,B) is computed from an optimally-exposed images and reference images, as will be apparent from the following.

Figure 5C:
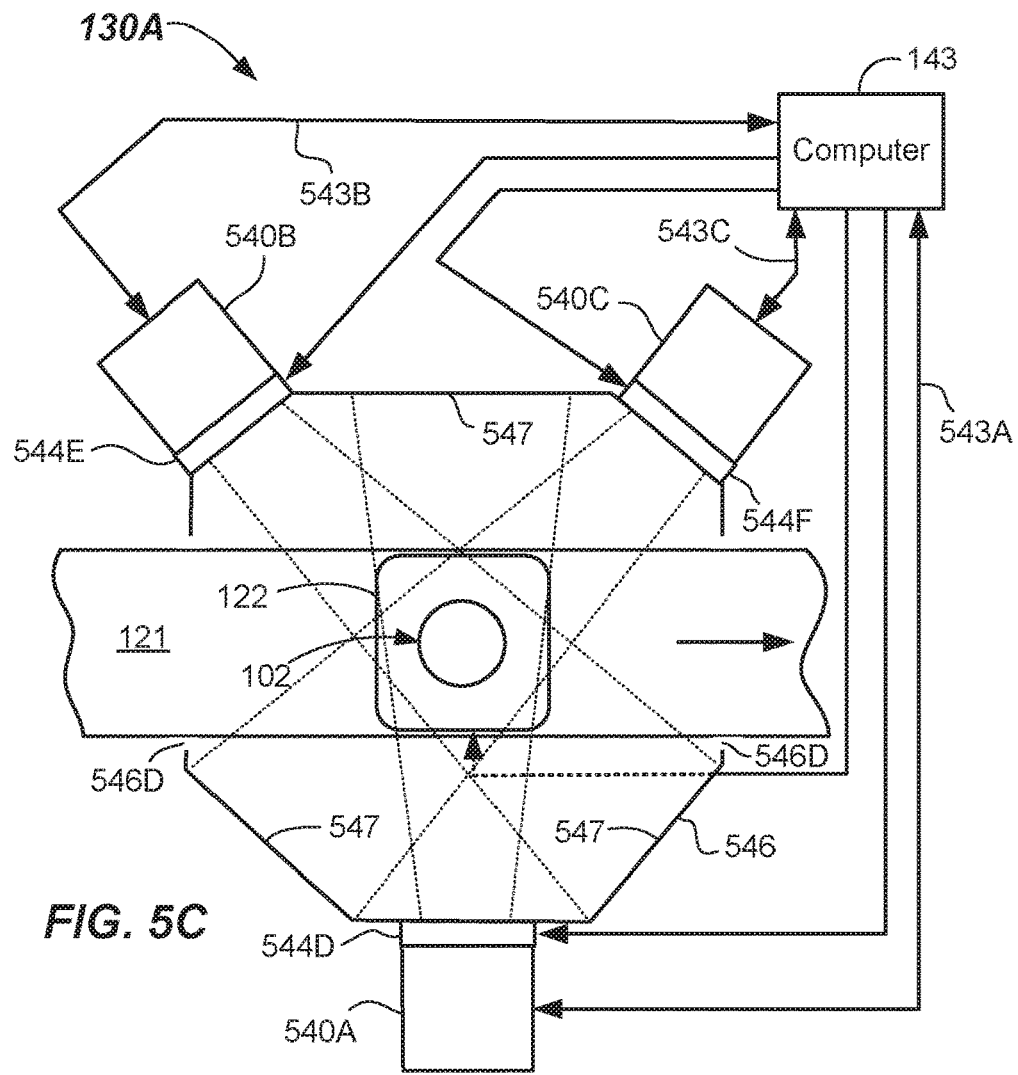
FIG. 5C illustrates a schematic top view of an alternate quality check module (with top housing portion removed to aid illustration) configured to capture and analyze multiple images for a presence of an artifact (e.g., clot, bubble, and/or foam) according to one or more embodiments.
Figure 5D:
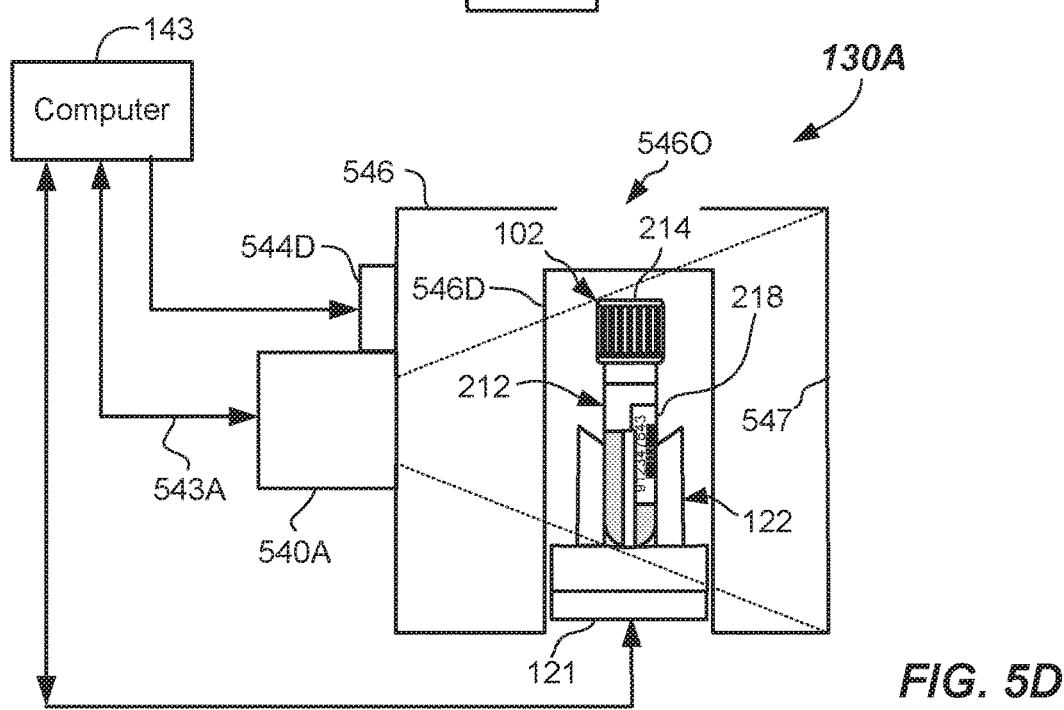
FIG. 5D illustrates a schematic side view (with side housing portion removed to aid illustration) of the quality check module of FIG. 5C according to one or more embodiments.

However, in optional embodiments, as best shown in FIGS. 5C and 5D, the specimen container 102 may be front lit in the quality check module 130A, such as by including light sources 544D, 544E, and 544F arranged adjacent to the cameras 540A, 540B, 540C, i.e., above, below, to the side, or combinations, but on the same side of the specimen container 102 as the respective cameras 540A-540C. In this embodiment, the cameras 540A-540C may be digital color cameras having RGB peaks of approximately 635 nm, 560 nm, and 450 nm, respectively, but wherein each of the RGB colors has relatively wider wavelength ranges as compared to the discreet sources used above with the monochrome cameras. In this embodiment, the light sources 544D, 544E, and 544F are each white light sources. For example, the white light sources 544D-544F (wavelength range of about 400 nm to about 700 nm) may be used to illuminate the specimen 212 and multiple images at different exposures (e.g., exposure times) may be taken by each camera 540A-540C. Each white-light image captured may be separated into two or more color components at multiple wavelengths comprise at least two wavelengths between about 400 nm and about 700 nm. For example, RGB components may be separated out by the computer 143 to generate multi-spectral, multi-time exposure images. Images may be captured via signals from the computer 143 in lines 543A-543C.

To capture images illuminated with a first spectra having a first nominal wavelength according to the first embodiment, three red light sources (wavelength peak of about 635 nm) may be used to simultaneously illuminate the specimen 212. The red illumination by the light sources 544A-544C may occur as multiple images (e.g., 4-8 images or more) at different exposure times are captured by each camera 540A-540C, such as with all cameras 540A-540C in synchronism for each exposure time. In some embodiments, the exposure times may be between about 0.1 ms and about 256 ms. Other exposure times may be used. For example, one exposure may be at 1 ms, another at 32 ms, another at 64 ms, and another at 128 ms may be used. Other numbers of exposures and time intervals may be used to capture multiple exposure time images. The red light sources 544A-544C may be turned on long enough to capture the image and then may be turned off.

After capturing images using the red light sources 544A-544C, they may be turned off and another spectra including a different nominal wavelength of light, for example, two or more green light sources 544A-544C may be turned on (wavelength peak of about 560 nm), and multiple images (e.g., 4-8 images or more) at different exposure times may be captured at that wavelength by each camera 540A-540C arranged at the different viewpoints. This may be repeated with two or more blue light sources 544A-544C (wavelength nominal of about 635 nm) for each camera 540A-540C. Thus, the result is a plurality of images captured at different exposures, different wavelengths, and from different viewpoints. Other nominal wavelengths or numbers of exposure times may be optionally or additionally used. The different wavelength light sources 544A-544C may be accomplished via use of exchangeable color band-pass filters, for example, or banks of different narrow-band colored RGB light sources that can be selectively turned on and off, for example. Other means for effectively lighting may be used.

To capture images according to the second embodiment, three white light sources 544D-544F may be used to simultaneously illuminate the specimen 212. As illuminated by the light sources 544D-544F, multiple images (e.g., 4-8 images or more) at different exposure times are taken by each camera 540A-540C, such as in synchronism. In some embodiments, the exposure times may be between about 0.1 ms and 256 ms. Other exposure times may be used. For example, one exposure may be at 1 ms, another at 32 ms, another at 64 ms, and another at 128 ms. Other numbers of exposures and time intervals may be used to capture multiple exposure time images. The multiple exposure images may be further processed by computer 143 to extract individual RGB images (obviously at lower pixel density) at each of the exposure times. Thus, the result is a plurality of images at different exposure times and at different nominal wavelengths.

For each embodiment, all of these multi-spectrum images taken at multiple exposure times for each respective wavelength or wavelength range (e.g., white light) may be obtained in rapid succession, such that the entire collection of images for the specimen 212 from multiple viewpoints may be obtained in less than about 2 seconds, or even less, for example.

To illustrate examples of the number of images captured for each specimen 212, the following examples are provided. According to the first embodiment, using RGB light sources for illumination and 4 different time exposure images for each wavelength and providing monochrome cameras at three viewpoints will result in 4 exposures×3 colors×3 viewpoints=36 images. According to the second embodiment, using white light sources and 4 different time exposure images and providing color cameras at three viewpoints will result in 4 exposures×3 viewpoints=12 images. However, these 12 images are then separated into RGB images by the computer 143, so that, in the end, 36 images are obtained, however the pixel density of these images is roughly ⅓ of the method of the first embodiment. In each case, the multi-exposure image data may be stored in memory of the computer 143, and may be subsequently processed thereby.

In one or more embodiments, the quality check module 130 may include a housing 546 that may at least partially surround or cover the track 121 and provide a closed or semi-closed environment for image capture. The specimen container 102 may be located inside the housing 546 during each image capture. Housing 546 may include one or more doors 546D to allow the carrier 122 to enter and/or exit the housing 546. In some embodiments, the ceiling may include an opening 546O to allow a specimen container 102 to be loaded into a carrier 122 stationed inside the housing 546 by a robot (e.g., robot 124) including moveable robot fingers from above, such as when the quality check module 130 is located at the loading area 105. In cases where front lighting is used (FIGS. 5C-5D), the quality check module 130 may include may include backstop walls 547 to provide improved image contrast. Backstop walls 547 may be any suitable color, such as other than the expected range of color of the specimen 212. In some embodiments, a black colored material may be used.

In one aspect, processing of the data of the multi-spectral, multi-time exposure images may be directed at first determining segmentation of the specimen 212 so that the liquid portion (e.g., the serum or plasma portion 212SP) may be identified. The processing may involve, for example, selection of optimally-exposed pixels from each of the multiple captured images taken at the different exposure times and at each wavelength for each camera so as to generate optimally-exposed image data set for each wavelength for each camera 540A-540C. Each optimized intensity value obtained for each pixel may be normalized with regards to its exposure time. This process of selecting and normalizing is referred to as "image consolidation" herein. During image consolidation, for each color, pixels in corresponding locations for each of the time exposure images are compared, and only pixels exhibiting optimal image intensity may be selected from each of the different exposure time images. Optimal image intensity pixels may be pixels that fall within a predetermined range of intensity (e.g., between 180-254 on a scale of 0-255), for example. However, in other embodiments, a predetermined range of intensity between 16-254 on a scale of 0-255 may be used. Other scales and optimal ranges may be used. If more than one pixel in the corresponding locations of two images is optimally exposed, then the higher of the two may be selected. The result is a plurality of consolidated color image data sets (e.g., with red, green, and blue illumination) for each camera 540A-540C where all of the pixels are optimally exposed and normalized (e.g., one image data set per nominal wavelength (e.g., red, green, blue)).

As part of the calibration process of the quality check module 130, reference images without a specimen container 102 or carrier 122 may be taken. The reference image(s) may be taken prior to loading a specimen container 102 and carrier 122 into the quality check module 130 and at all the exposure times and lighting conditions that will be later used during image capture. In this way, the background may be removed from each image data set. This is referred to as "background removal" herein.

Figure 6:
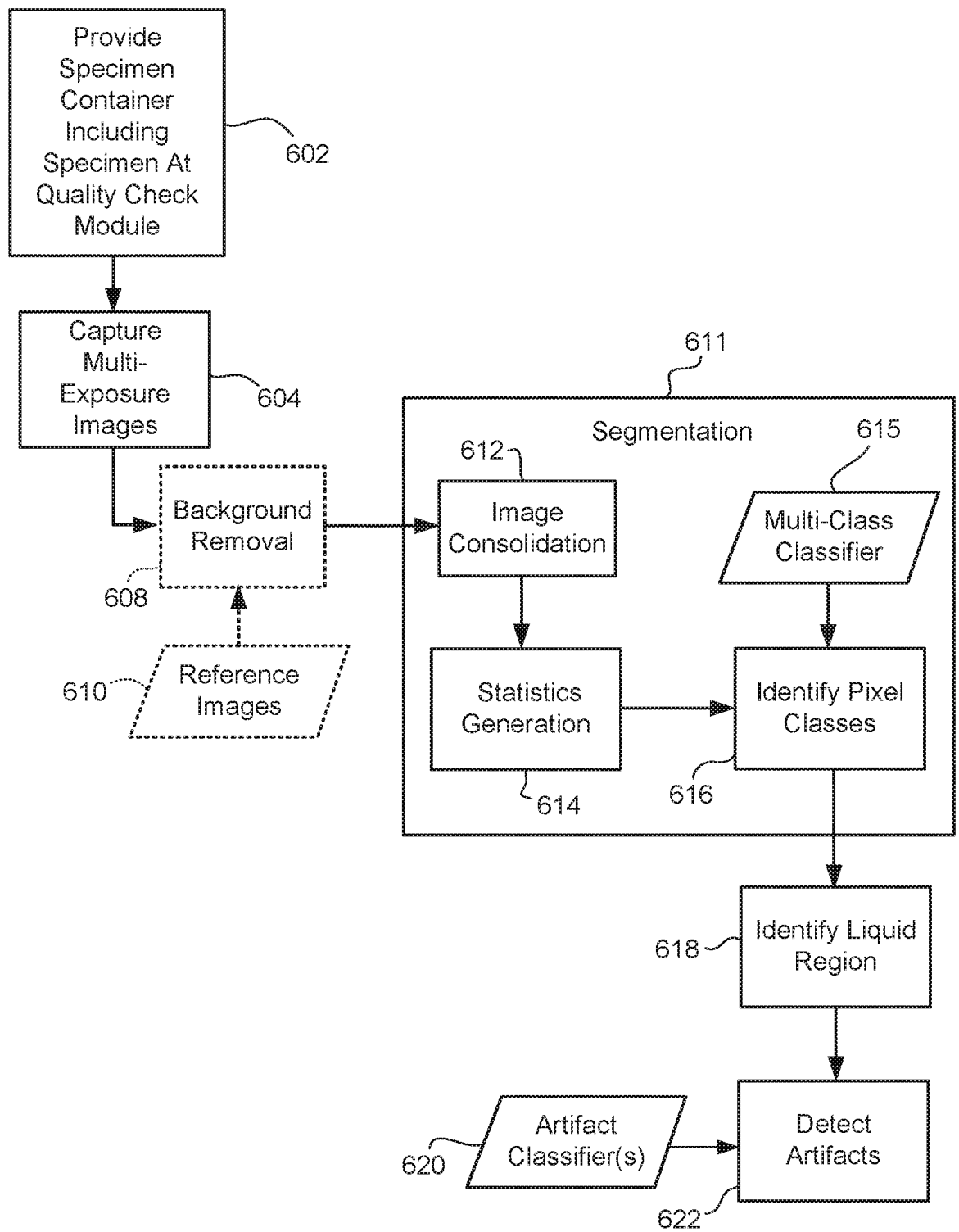
FIG. 6 illustrates a flowchart of functional components of a quality check module adapted to determine a presence of an artifact within a specimen according to one or more embodiments.

For each image data set including optimally-exposed pixels, a fluid characterization process is undertaken to classify each of the pixels within the consolidated image data sets. This is referred to as "segmentation" in that the various segments of the specimen 212 and specimen container 102 may be characterized, i.e., the boundaries thereof may be determined. This may be used to identify the liquid portion (e.g., the serum or plasma portion 212SP), gel separator 413 (if any), settled blood portion 212SB, and lines of demarcation between the components (e.g. LA, SB, SG, BG). The segmentation may be based on classifying the pixels in the optimally-exposed image data as belonging to a class based upon a classifier model (FIG. 6). The classifier model may be based upon a multi-class classifier 615 generated from multiple training sets. The multi-class classifier 615 may comprise a support vector machine (SVM) or a random decision tree, for example.

To carry out the classification, first statistical data may be computed for each of the optimally-exposed and normalized pixels at the different nominal wavelengths (e.g., red, green, blue) and for each camera 540A-540C. The statistical data may include mean values, variance, and covariance up to second order. For each pixel location, a statistical description may be extracted within a small super-pixel patch (e.g. 11×11 pixels). Each super-pixel patch provides a descriptor, which is considered in the training and evaluation process. Typically the classifiers operate on feature descriptors and use class labels for training and output class labels during testing/evaluation.

Once generated, the statistical data is presented to and operated on by the multi-class classifier 615, which may classify the pixels in the images as belonging to one of a plurality of class labels, such as 1—serum or plasma portion, 2—settled blood portion, 3—cap, 4—label, 5—specimen container, 6—air, and 7—gel separator (if used). Carrier 122 may also be classified. From this segmentation, the pixels making up the liquid region, i.e., the serum and plasma portion 212SP may be identified.

The results of the multi-class classifier 615 are then fed into one or more artifact classifiers 620 configured to identify whether an artifact is present within the liquid region, or not. Thus, effectively, the one or more artifact classifiers 620 identifies, based on the statistical data, whether an artifact is present within one or more regions of the serum or plasma portion 212SP, or is absent within the serum or plasma portion 212SP. In one or more embodiments, the artifact classifiers 620 may be embodied as one or more different artifact type models, such as a clot model, a bubble model, and a foam model. Each artifact type model may be a binary classification model. The result of operating on the data previously defined as liquid region is a determination of the presence or absence of an artifact in the serum or plasma portion 212SP.

A simple flow chart of the artifact detection method is shown in FIG. 6. First the specimen container 102 including specimen 212 being carried by carrier 122 is provided at the quality check module 130 in 602. Multiple exposure images are captured at 604; the multiple exposure images being multi-spectral images taken at multiple different exposure times and at multiple different nominal wavelengths (and/or wavelengths ranges) and described above. The multiple images may then be stored in memory of the computer 143. From these images, the background may optionally be removed in a background removal phase in 608 to lower computational burden. Background removal may be accomplished by subtracting reference images taken in 610, which may be taken as part of a calibration or as part of the method before the specimen container 102 and carrier 122 arrive at the quality check module 130.

After image capture, and possible background removal, the segmentation process may be accomplished on the multiple-exposure, multiple-spectra data sets for each camera 540A-540C, as shown in 611. The segmentation may include an image consolidation phase that may be undertaken in 612. During this image consolidation process, the various images at each color (e.g., nominal wavelength) are reviewed pixel by pixel to determine those pixels that are optimally exposed. For each corresponding pixel location, the best of any optimally exposed pixel, is selected and included in an optimally-exposed image data set. Thus, following image consolidation in 612, there is produced one optimally-exposed image data set for each wavelength. Normalization of each pixel intensity by the exposure time may also be undertaken.

Following image consolidation, or possibly concurrent therewith, a statistics generation process is undertaken in 614 where statistics are generated for each pixel, such as mean, standard deviation, and/or covariance. This statistical data and color information from the optimally-exposed data sets are then operated on by a multi-class classifier 615 to provide identification of pixel classes in 616. From this classification process of 616, each pixel in a consolidated image for each of the cameras 540A-540C is given a classification as being one of a plurality of class types. Class types may be liquid (serum or plasma portion 212SP), settled blood portion 212SB, transparent material (e.g., tube 212T), label 218, gel separator 413, or air 212A, or cap 214, or example.

From this, the liquid area is determined in 618 by collecting all the pixels of the class liquid (serum or plasma portion 212SP). Finally, the data set of the liquid region is operated on by the artifact classifiers 620 to detect any artifacts (e.g., clot, bubble, foam) present in the liquid region. The artifact classifiers 620 may be separate binary classification models, one for each of clot detection, bubble detection, and foam detection in some embodiments.

Identifying the liquid region in 618 may also involve identifying the location of the upper interface between liquid (serum or plasma portion 212SP) and air 212A (i.e., LA), SB, or the SPG (if a gel separator 413 is used), and the width (W). This may be accomplished by selecting the pixels at these demarcation areas and averaging their location values. From this information, the volume of the serum or plasma portion 212SP may be determined. For determining the actual width of the specimen based upon the width W of the tube 212T, an average wall thickness (Tw) value may be used, such that the width of the specimen (Ws) is calculated by controller to equal to W−2Tw. Of course, to provide an even closer measurement of the actual volume of serum or plasma portion 212SP available, the artifact detection method may be employed in 622 to identify a presence of clot, bubbles, or foam. The respective estimated volume of the one or more artifacts present may be subtracted from the estimated volume of the serum or plasma portion based on the liquid model.

Figure 7:
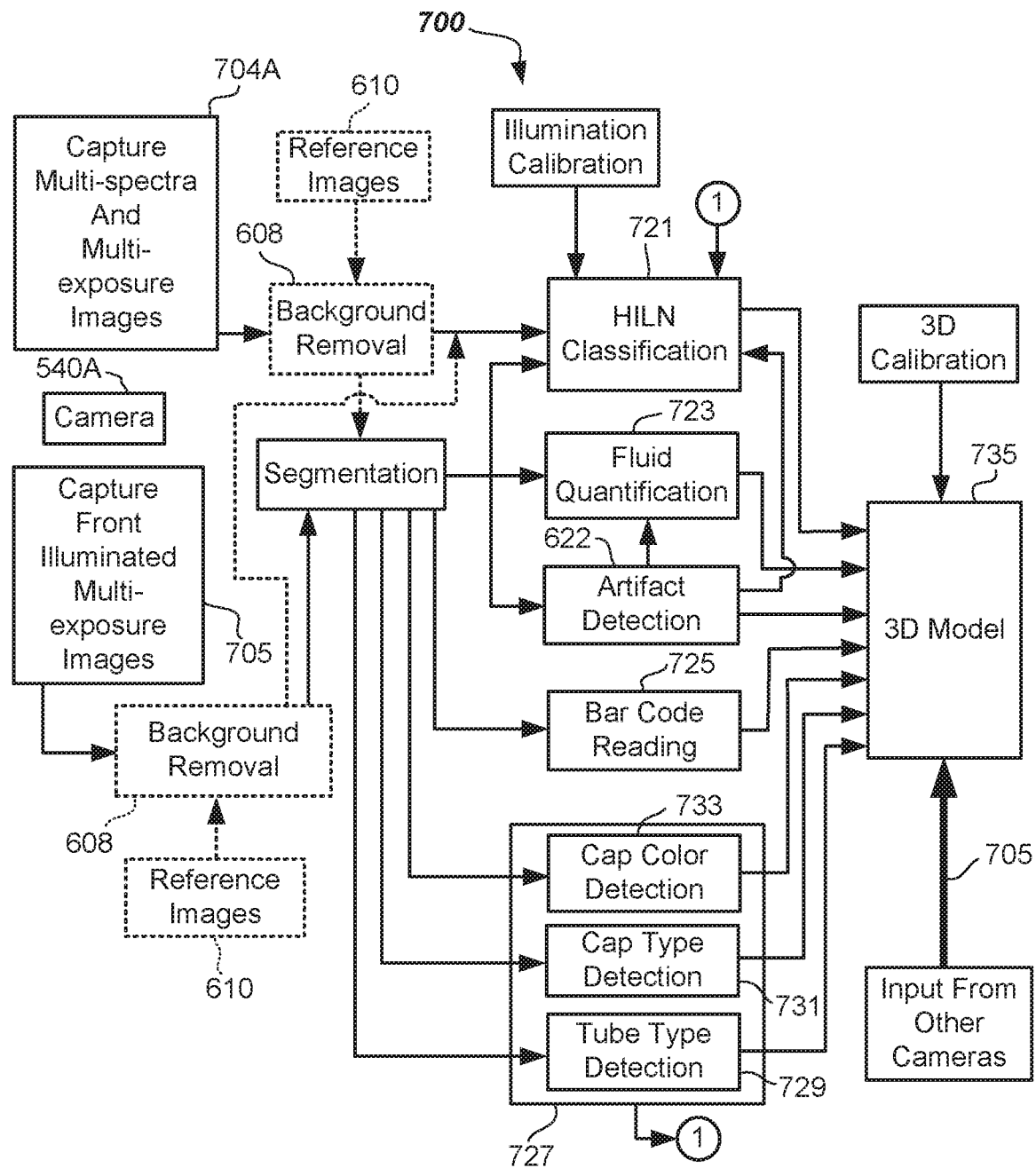
FIG. 7 illustrates flowchart of a broad imaging method adapted to determine information about a specimen including determining a presence of an artifact according to one or more embodiments.

FIG. 7 illustrates a flowchart of a broader characterization method 700 wherein the characterization of one or more artifacts present of the specimen 212 is just one of the many items that are characterized or classified by the broader method 700. According to one or more embodiments of the method 700, images are captured, such as by multiple cameras (camera 540A is shown). The processing that will be described for the images captured on camera 540A is identical for the other cameras 540B, 540C at the other viewpoints and their inputs in line 705 may be used to develop a 3D model of the specimen 212. The images captured by camera 540A and the other cameras 540B, 540C may be multi-spectral and multi-exposure images as discussed above. In particular, multiple exposures (e.g., 4-8 exposures or more) may be taken for each nominal wavelength of light illumination used in 704A. The respective images at each exposure for each camera 540A-540C may be obtained simultaneously using monochrome cameras and backlight light sources 544A-544C as described in FIG. 5A-5B. Optionally, front illuminated multi-exposure images using a white light sources 544D-544F may be obtained in 704B using a color camera.

The images may then be processed in 608 to remove background using reference images 610 as described above in optional background removal method. The images are then further processed to determine segmentation in 611 in the manner described above. In some embodiments, the images from front lit cameras 540A-540C (see FIG. 5C-5D) from 704B may be best used for segmentation in 611. Likewise, the images captured in 704A may be best used for characterization of HILN in 721. However, clearly, images captured in 704B could be used for segmentation in 611

The images are then processed to determine the presence of or absence of an artifact in the serum or plasma portion 212SP in 622 using artifact classifiers 620 (FIG. 6). For example, in one embodiment, the method 700 is directed at determining a presence of a clot in the serum or plasma portion 212SP of the specimen 212. In another embodiment, the method 700 is directed at determining a presence of a bubble in the serum or plasma portion 212SP of the specimen 212. In another embodiment, the method 700 is directed at determining a presence of foam in the serum or plasma portion 212SP of the specimen 212. The output of the artifact detection in 622 can be used as an input to the HILN classification in 721 so that the presence of an artifact will not skew the HILN results. Those pixels including artifacts identified in 622 may then be ignored be the HILN classification in 721.

Once the segmentation is completed in 611, the fluid can be quantified in 723. This may involve the determination of certain physical dimensional characteristics of the specimen 212 such as a physical location of LA, SB, SG, and/or BG, and/or determination of HSP, HSB, and/or HTOT, and/or a volume of the serum or plasma portion (VSP) and/or a volume of the settled blood portion (VSB). Input from the artifact detection 622 may be used to better characterize LA when a foam artifact is present and may help generate a better estimate of the serum or plasma portion (VSP) by subtracting an estimate of a volume of any artifact present.

The results of the segmentation in 611 can also be used to read the barcode in 725. Conventional barcode reading software may be used once the label 218 is identified by the segmentation in 611.

Characterization of the specimen container 102 may also be accomplished according to the broader method 700 in 727. The characterization may determine the tube type in 729, cap type in 731, and/or cap color in 733. All of these outputs are fed into a 3D model 735 and can then be used for 3D reasoning or verification of the 2D results.

Figure 8:
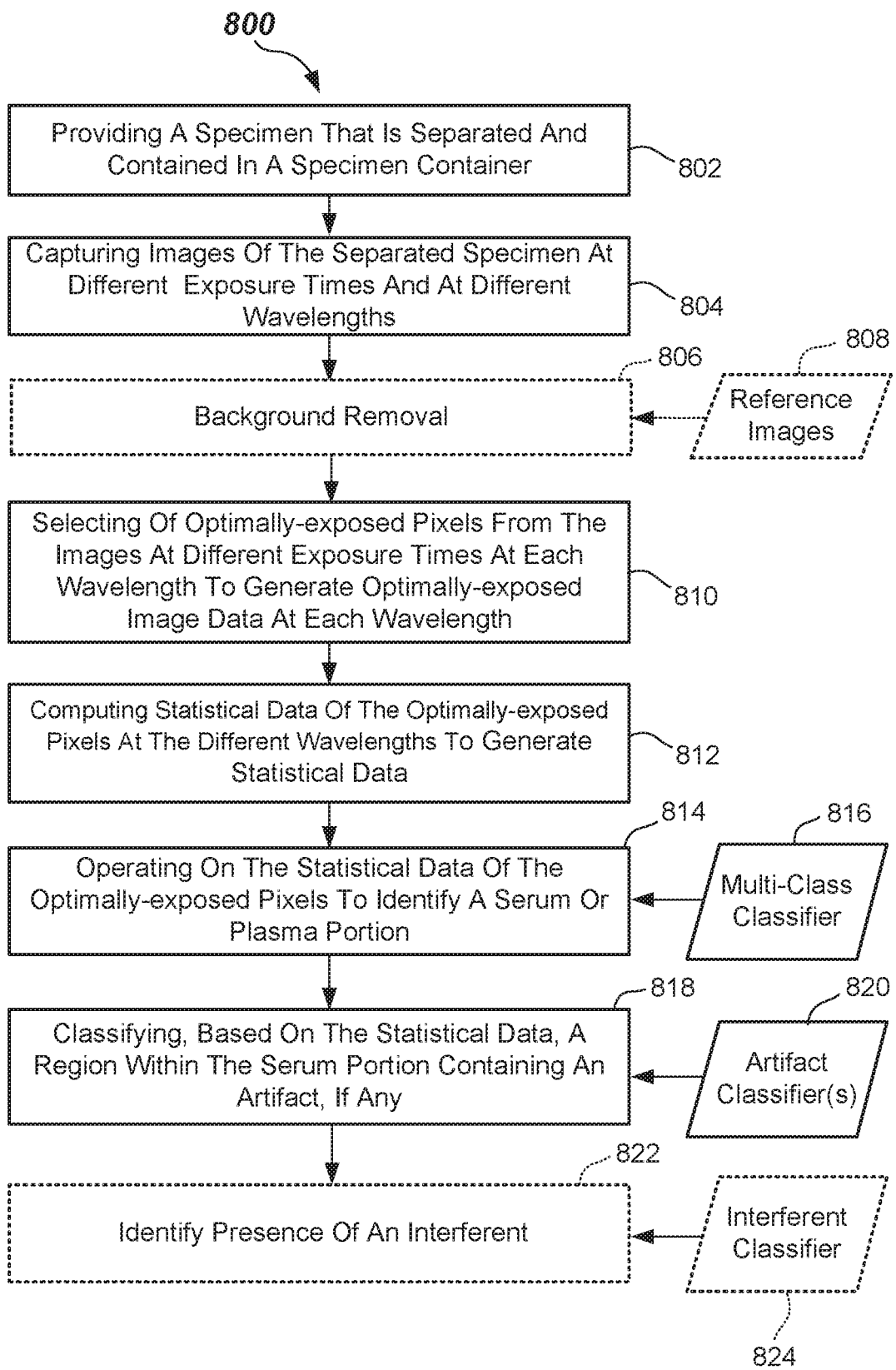
FIG. 8 illustrates flowchart of a method of determining an artifact in a specimen contained within a specimen container according to one or more embodiments.

FIG. 8 illustrates a flowchart of a method of determining if an artifact (e.g., one or more of a clot, bubble, and/or foam) is present in a specimen 212 contained within a specimen container 102 according to one or more embodiments of the present invention. The method 800 includes, in 802, providing a specimen (e.g., specimen 212) that is separated. The specimen 212 may be contained in a specimen container 102 and may include at least serum or plasma portion 212SP and settled blood portion 212SB, but may also include a gel separator 413 in some embodiments. The specimen 212 may be separated by centrifugation or other suitable means. In 804, the method 800 includes capturing images of the separated specimen 212 at multiple different exposures times and at multiple different nominal wavelengths of illumination. For example, there may be 4-8 or more different exposures taken in some embodiments. Some images may be captured using white light for front lighting and some may be captured using a plurality of different nominal wavelength, narrow-band light sources, such as red, blue and green as backlit light sources 544A-544C. The white light images may be resolved into R, G, and B spectral images, as discussed above. In each instance, the images may be taken by multiple cameras 540A-540C from multiple viewpoints.

In 806, the method 800 may optionally include background removal. Background removal may be accomplished by subtracting reference images 808 from the specimen images, which may be taken as part of a calibration process. Reference images 808 may be taken at the same exposure times as for the images of the specimen 212, but may be captured without a specimen container 102 or carrier 122 at the quality check module 130.

The method 800 further includes, in 810, selecting optimally-exposed pixels from the captured images (which may have undergone background removal) at the different exposure times at each nominal wavelength of illumination to generate optimally-exposed image data for each spectra. For each corresponding pixel in each image at a particular wavelength spectra, the best exposed pixel (not under or over exposed) is selected. The optimal exposure range may be as discussed above. This selecting optimally-exposed pixels takes place in an image consolidation phase (e.g., image consolidation 612). Thus, for each of the RGB spectra, a data set of optimally-exposed pixels is generated. The data set of optimally-exposed pixels may then be normalized.

In 812, the method 800 includes computing statistical data on the optimally-exposed pixels at the different spectra to generate statistical data, and then, in 814, operating on the statistical data of the optimally-exposed pixels to identify at least a serum or plasma portion 212SP (i.e., the liquid portion of the specimen 212 that has been separated). Identifying at least the serum or plasma portion 212SP (see 618) may be accomplished by operating on the statistical data of the optimally-exposed pixels with a multi-class classifier 816 to identify the particular class of pixels that are identified as serum or plasma portion 212SP. Other classes (e.g., settled blood portion 212SB, gel separator 413, tube 212T, label 218, air 212A, cap 214) may also be identified by the segmentation, such as in 616.

In one or more embodiments, the multi-class classifier 816 may be a support vector machine (SVM) that is either linear or kernel-based. Optionally, multi-class classifier 816 may be a boosting classifier such as an adaptive boosting classifier (e.g., AdaBoost, LogitBoost, or the like), any artificial neural network, a tree-based classifier (e.g., decision tree, random decision forests), a logistic regression as a classifier, or the like. SVM may be particularly effective for classification between liquids and non-liquids and this is desirable to use for identifying serum or plasma portion 212SP. A SVM is a supervised learning model with associated learning algorithms that analyzes data and recognizes patterns. SVMs are used for classification and regression analysis.

Multiple sets of training examples are used to train the multi-class classifier 816, and then the pixels are operated on by the multi-class classifier 816 and are marked as belonging to one of multiple classes, as discussed above. A SVM training algorithm builds the multi-class classifier 816 and assigns any new examples into one of the classes. Thus, the multi-class classifier 816 may be a non-probabilistic linear classifier in some embodiments. The SVM model represents examples as points in space that are mapped so that the examples of the separate classes are divided by a clear gap that is as wide as possible. Pixels from the optimally-exposed image data set may be mapped into that same space and predicted to belong to a particular class based on where they fall. In some embodiments, SVMs can efficiently perform a non-linear classification using what is called a kernel trick (e.g., kernel-based SVM classifier), implicitly mapping their inputs into high-dimensional feature spaces. SVM and boosting may also be used. Other types of multi-class classifiers may be used.

The multi-class classifier 816 may be trained by graphically outlining various regions (e.g., serum or plasma portion 212SP, settled blood portion 212SB, gel separator 413, air 212A, tube 212T, cap 214, label 218) in a multitude of examples of specimen containers 102 having various specimen conditions, such as being occluded by label 218, levels of serum or plasma portion 212SP and settled blood portions 212SB, and the like. As many as 500 or more images may be used for training the multi-class classifier 816. Each training image may be outlined manually to identify and teach the multi-class classifier 816 which areas belong to each class. Other training methods may be used.

In 818, the method 800 includes classifying, based on the statistical data whether an artifact (e.g., clot, bubble, and/or foam) is present within one or more regions of the serum or plasma portion (e.g., serum or plasma portion 212SP), or is absent within the serum or plasma portion. As with the previous classification, the classification of the presence of an artifact may be carried out using one or more artifact classifiers 822. In some embodiments, artifact classifiers 822 may be a series of trained classification models, each being trained to identify a different artifact. For example, the classification may take place by operating on the pixels contained in the serum or plasma portion with individual clot classifier, bubble classifier, and foam classifier. In other embodiments, the artifact classifier may be a multi-class classifier capable of identifying each of the artifacts (e.g., clot, bubble, and/or foam).

Once each pixel is classified as containing or not containing an artifact using the artifact classifier 820, the method 800 may additionally, in 822, determine a presence of one or more interferent within the serum or plasma portion 212SP. In one or more embodiments, the determination of the presence of one or more interferent involves first analyzing the pixels and statistical data previously generated to characterize individual ones of the pixels as being either normal (N), or containing Hemolysis (H), Icterus (I) or Lipemia (L). In other embodiments, a different data set (e.g., data set from the multiple images taken with RGB backlit sources) may be used. From this determination, an overall classification of the serum or plasma portion 212SP is provided. The overall classification of the serum or plasma portion 212SP may be as being normal (N) or including a particular type or types of interferent. For example, the particular interferent type in the serum or plasma portion 212SP may be determined to be one or more of H, I, and/or L.

As with the multi-class classifier 816 described above, an interferent classifier 824 may include any suitable supervised classification mode as discussed above. Interferent classifier 824 may be used to determine whether the pixels that are classified as a liquid are one of the classes of N, H, I, or L. The interferent classifier 824 may be based on a multi-class classification model that has been sufficiently trained based on multiple interferent training sets. The interferent classifier 824 (e.g., a four class classification model) may be a support vector machine (SVM), support-vector network, or a boosting class algorithm. Examples of support vector machines and networks are described in a paper entitled "Support-vector Networks" by C. Cortes and V. Vapnik in Machine Learning Vol. 20, Issue 3, page 273-297, and in a paper entitled "Additive Logistic Regression: A Statistical View of Boosting" by J. Friedman, T. Hastie, R. Tibshirani (1998), and "A Short Introduction to Boosting" by Y. Freund and R. E. Schapire (1999).

Once the pixels have been classified as being N, H, I, or L by the interferent classifier 824, the method 800 may include determining whether the serum or plasma portion 212SP of the specimen 212 is, as a whole, normal (N), or if not normal (N), characterizing the interferent type, as a whole. If the specimen 212 is deemed to be normal (N) and not containing an artifact, then the specimen 212 may simply progress on the track 121 to an analyzer (e.g., analyzer 106, 108, and/or 110) for which tests were ordered.

If specimen 212 is non-normal, then the interferent type may be determined by adding a number of pixels in the liquid region that have been previously classified as being N, H, I, or L. The classification as normal (N) or as containing an interferent may be based upon a largest number in each class, or a weighting scheme in some embodiments. Thus, in one embodiment, if a majority of pixels are classified as N, then the specimen 212 may be categorized as normal (N). If a majority of pixels are classified as H, then the specimen 212 may be categorized as hemolysis (H). Likewise, if a majority of pixels are classified as I or L, then the specimen 212 may be categorized as Icterus (I), or lipemia (L), respectively. In other embodiments, a weighted majority voting scheme may be also used to classify the specimen 212 using the probabilities from the pixel classifier 458 as a weight. Other means for characterizing the specimen 212, as a whole, may be used.

Alternatively, if the specimen 212 has a relatively large amount of pixels that are classified in two or more interferent classes (e.g., H and I, H and L, I and L, or even HIL), then the method may report that multiple interferent types are present in the specimen 212.

Once the specimen 212 has been given a characterization as containing an interferent (e.g., H, I, and/or L), an interferent level detector may be used to provide an interferent level for one or more interferent types in the specimen 212. Interferent level detector may obtain an interferent level for the particular interferent by passing the pixels determined to be liquid by the interferent classifier 824 through a level characterizing model, such as a supervised regression model. Any suitable regression model may be used, such as support vector regression (SVR), neural network regression, tree-based regression, or the like.

A different regression model, such as hemolysis regression model, icterus regression model, and lipemia regression model may be used for each pixel of each interferent type. In one or more embodiments, each of the regression models may be SVR machines and may be trained using only liquid regions that exhibit that particular type of interferent (e.g., H, I, or L). For example, the hemolysis regression model may be trained with a broad range of hemolyzed specimens 212 having hemolysis levels across a diverse range of expected hemolysis levels. For example, hemolysis ranges may include hemolysis levels from about 50-525. Likewise, the icterus regression model may be trained with a broad range of icteric specimens 212 having icterus levels across a diverse range of expected levels, including icterus levels from about 1.7 to 30. Similarly, lipemia regression model may be trained with a broad range of lipemic specimens 212 having lipemia levels across a diverse range of expected levels, including lipemia levels from about 125-1000.

In some embodiments, the interferent levels may be discretized. For example, for the hemolysis regression model, discreet hemolysis levels of 50, 150, 250, and 525 may be used. For the icterus regression model, discreet icterus levels of 1.7, 6.6, 16, and 30 may be used, and for the lipemia regression model, discreet lipemia levels of 125, 250, 500, and 1000 may be used.

Accordingly, based on the foregoing it should be apparent that the model-based artifact detection method 800 carried out by the quality check module 130 may result in a rapid characterization of the specimen 212 as being either normal or containing one or more artifacts therein. In another aspect, the method 800 may also determine whether an interferent is present, and if so identify the interferent type or types present, and may also determine an interferent level for each interferent type present.

While the quality check module 130 has been shown in FIG. 1 as being located such that the pre-screening is performed immediately after centrifugation on the centrifuge 125, it may be advantageous to include the quality check module 130 directly on an analyzer (e.g., analyzer 106, 108, and/or 110) in some embodiments, or elsewhere. For example, stand-alone analyzers that are not connected to an automated specimen container handling system could use the quality check module 130 to validate specimens 212 prior to analysis. Furthermore, in some embodiments, the centrifugation may be performed prior to loading the racks 104 into the loading area 105, so that in some embodiments, the quality check module 130 may be located at the loading area 105 and the quality check can be carried out as soon as the robot 124 loads a specimen container 102 into a carrier 122. Other locations for the quality check module are possible.

While the invention is susceptible to various modifications and alternative forms, specific system and apparatus embodiments and methods thereof have been shown by way of example in the drawings and are described in detail herein. It should be understood, however, that it is not intended to limit the invention to the particular systems, apparatus, or methods disclosed but, to the contrary, the intention is to cover all modifications, equivalents, and alternatives falling within the scope of the invention.

What is claimed is:

1. A method of determining an artifact in a specimen contained within a specimen container, comprising:
   providing a specimen that is separated and contained in a specimen container;
   capturing images of the specimen at multiple different exposures and at multiple different wavelengths;
   selecting optimally-exposed pixels from the captured images at the different exposures at each wavelength to generate optimally-exposed image data for each wavelength;
   computing statistics on the optimally-exposed pixels at the different wavelengths to generate statistical data;
   identifying a serum or plasma portion of the specimen based on the statistical data; and
   classifying, based on the statistical data, whether an artifact is:
      present within one or more regions of the serum or plasma portion, or
      absent within the serum or plasma portion.

2. The method of claim 1, wherein the artifact is selected from a group including at least one of a clot, a bubble, or foam.

3. The method of claim 1, wherein the specimen is centrifuged and includes a separated blood portion and a serum or plasma portion.

4. The method of claim 1, wherein the capturing images of the specimen involves capturing multiple images taken from a number of viewpoints.

5. The method of claim 4, wherein the number of viewpoints comprises 3 or more.

6. The method of claim 1, wherein the providing the specimen comprises securing the specimen container containing the specimen in a holder.

7. The method of claim 1, wherein the multiple different wavelengths comprise at least two wavelengths between about 400 nm and about 700 nm.

8. The method of claim 1, wherein the multiple wavelengths comprise at least two wavelengths selected from a group of about 455 nm, about 537 nm, and about 634 nm.

9. The method of claim 1, wherein the multiple exposures times comprise between about 0.1 ms and about 256 ms.

10. The method of claim 1, wherein the selecting optimally-exposed pixels comprises selecting pixels from the images that include intensities of between about 180-254 based upon an intensity range of 0-255.

11. The method of claim 1, wherein the identifying a serum or plasma portion is based upon classifying of pixels in optimally-exposed image data based upon a multi-class classifier generated from multiple training sets.

12. The method of claim 11, wherein the multi-class classifier further comprises a support vector machine or a random decision tree.

13. The method of claim 1, wherein classifying, based on the statistical data whether an artifact is present within one or more regions of the serum or plasma portion, or is absence within the serum or plasma portion, is based upon one or more classifiers generated from multiple artifact training sets.

14. The method of claim 13, wherein the one or more classifiers comprises a separate binary classifier for each of clot, bubble, and foam.

15. The method of claim 1, wherein the computing statistics of the optimally-exposed pixels from the optimally-exposed image data for each wavelength comprises calculating a mean value, a standard deviation, and/or covariance from a collection of corresponding pixels from each wavelength.

16. The method of claim 1, comprising determining an identity of the specimen based upon deciphering a bar code in the capturing images.

17. The method of claim 1, comprising grouping the optimally-exposed image data of the specimen to form a 3D model.

18. The method of claim 1, wherein the identifying a serum or plasma portion of the separated specimen comprises ignoring portions of a holder within the images.

19. A quality check module adapted to determine presence of an artifact in a specimen contained within a specimen container, comprising:
   a plurality of cameras arranged around the specimen container and configured to capture multiple images of the specimen container from multiple viewpoints, each adapted to generate a plurality of images taken at multiple different exposure times and at multiple different wavelengths; and
   a computer coupled to the plurality of cameras and adapted to process image data from the images, the computer configured and capable of being operated to:
      select optimally-exposed pixels from the images at the different exposure times to generate optimally-exposed image data for each wavelength,
      compute statistics of the optimally-exposed pixels at each of the wavelengths to generate statistical data,
      identify a serum or plasma portion of the specimen, and
      classify, based on the statistical data, whether an artifact is:
         present within one or more regions of the serum or plasma portion, or
         absent within the serum or plasma portion.

20. A testing apparatus adapted to determine a presence of an artifact in a specimen contained within a specimen container, comprising:
   a track;
   a carrier on the track that is configured to contain the specimen container;
   a plurality of cameras arranged around the track and configured to capture multiple images of the specimen container from multiple viewpoints, each camera is configured to generate a plurality of images at multiple different exposures and multiple different wavelengths; and
   a computer coupled to the cameras and configured to process image data from the multiple images, the computer configured and capable of being operated to:
      select optimally-exposed pixels from the multiple images at the different exposures to generate optimally-exposed image data for each wavelength,
      compute statistics on the optimally-exposed pixels at the different wavelengths to generate statistical data,
      identify a serum or plasma portion of the specimen, and
      classify, based on the statistical data, whether an artifact is:
         present within one or more regions of the serum or plasma portion, or
         absent within the serum or plasma portion.

* * * * *